Sept. 27, 1927.

R. M. MANNING 1,643,818

BALL UNSEATING DEVICE IN LINE VALVES

Filed March 18, 1927

R. A. Thomas

WITNESS:

R. M. Manning
INVENTOR

BY Victor J. Evans
ATTORNEY

Patented Sept. 27, 1927.

1,643,818

UNITED STATES PATENT OFFICE.

ROBERT M. MANNING, OF MEXIA, TEXAS.

BALL-UNSEATING DEVICE IN LINE VALVES.

Application filed March 18, 1927. Serial No. 176,541.

My present invention has reference to a valve for use in pipe lines in oil fields for controlling the flow of oil from the tanks and may be considered an improvement upon my U. S. Letters Patent No. 1,602,279, dated Oct. 5, 1926.

A further object is the provision of a line valve that will prevent back pressure and will automatically close the line to keep out air after the tank has been emptied and the oil ceases to flow, the said valve being of a particular and novel construction and having means for unseating the same when the tank has been refilled and the oil is again drawn therefrom.

The drawings illustrate a satisfactory embodiment of my improvement and wherein.

Figure 1:
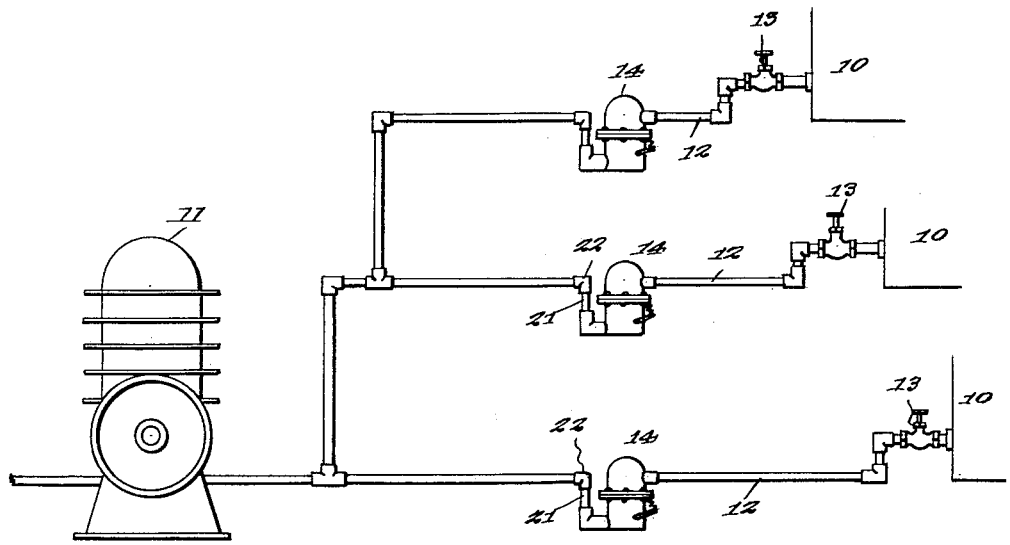
Figure 1 is a diagram illustrating the use of the invention.
Figure 2:
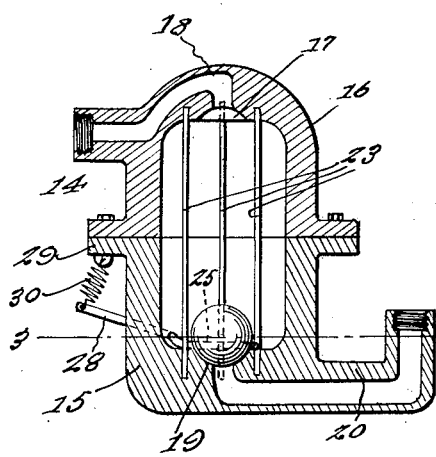
Figure 2 is a central longitudinal sectional view through the invention per se.
Figure 3:
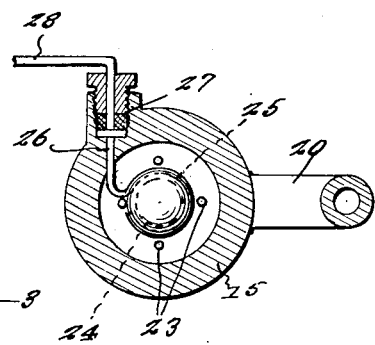
Figure 3 is a sectional view on the line 3—3 of Figure 2.

Referring now to the drawings in detail, the numeral 10 designates the tank from which the oil is adapted to flow by gravity under the influence of a vacuum pump 11, a conduit pipe 12 connecting the pump and tank. The pipe 12, adjacent to the tank 10, has its passage controlled by a manually operated valve 13. All of the pipes 12 have their outlet ends branched to the pump 11, as clearly disclosed by Figure 1 of the drawings.

In each of the pipes 12 there is a valve in accordance with this invention. Each valve comprises a two part casing 14, the confronting ends of the casing sections being flanged outwardly and bolted together, a suitable packing if desired being arranged between such confronting ends. For distinction the lower section of the valve casing is indicated by the numeral 15 and the upper section by the numeral 16. Both of these sections have an elongated communicating bore, the upper section being provided with a concaved valve seat 17 that communicates with a port 18 leading downwardly to a nipple in which one of the sections of the pipe 12 is screwed. The lower section 15 is centrally provided with a valve seat 19 which communicates with the longitudinal port formed in a substantially L-shaped extension 20 at the base of the casing section 15. The upwardly extending element of the extension 20 has screwed therein a short pipe 21 connected by a coupling 22 to the section of the pipe 12 that is directed to the pump 11. The coupling 22 is arranged approximately in a line with the port in the top of the casing section 16.

Having their ends received in suitable openings in the top and bottom walls of the sections of the casing there are rods 23 and between these rods there is a float valve 24. On the bottom of the bore of the casing section 15 there normally rest laterally extending fingers 25 formed on a shaft 26 that passes through a suitable packing box 27 in one side of the section 15 of the valve casing 14. The shaft 26 has on its outer end a lever 28, and connected to this lever and to the flange 29 of the casing section 15 there is a spring 30.

The invention is intended for use in oil fields where the oil from the tanks is run out by gravity, the flow being assisted by vacuum created by a suction pump located at a station on the receiving line, and this station being located on a lower level than are the tanks. When a tank is emptied the air following the oil will be prevented from entering the pump by the valve 24 seating itelf on the lower seat 19 through the suction created by the pump and by gravity. When the tank is refilled and is emptied again it is necessary to raise the valve from its seat and, therefore, I have employed the lifting device comprising the shaft 26 and the fingers 25. Unless a means for this purpose is provided I have found from experience that the valve will stick on its seat. The unseating of the valve permits of the flow of oil as above explained. As soon as the tank is emptied the air following the oil will be prevented from entering the system by the seating of the valve 24, and if oil pressure should occur in the pipe which connects the valve with the pump, due to the flow of oil through other tanks, the valve 24 will be seated on the upper seat 17 by this pressure and thus the oil from other tanks will be prevented from entering the tank and overflowing the same.

I have herein stated and disclosed by the drawings that a valve is attached to each tank 10. This is not an absolute necessity, as one valve may be connected with a battery of perhaps a dozen or more tanks, and the valve is only attached to a single tank when only a single tank is employed. Also I have found that the employment of the spring finger is not an absolute requirement and, of course, do not wish to be restricted to the precise construction of the valve unseating device.

Having described the invention, I claim:—

1. An apparatus of the class described, comprising in combination with a conduit and a valve in the conduit, said valve embodying a casing having valve seats in the top and bottom thereof, and ports communicating with said seats and which ports are piped to the conduit, rods extending between said seats and providing a cage in the valve casing, a float valve guided between the rods, means normally resting at the sides of the lower seat, and swingable from the exterior of the valve casing for raising the valve from said lower seat when the same occupies such seat.

2. A valve for the purpose set forth, including a two-part casing, the sections of which being flanged and connected together, said casing having inner top and bottom seats and having ports communicating with said seats, spaced rods surrounding the valve seats and let in the respective sections of the casing, a shaft journaled transversely in the lower casing section and having fingers thereon disposed between certain of the rods and at the opposite sides of the lower valve seat, a packing box through which the shaft passes, a lever on the outer end of the shaft and a spring between the lever and the valve casing for normally influencing the lever to cause its fingers to rest on the lower wall of the casing and a spherical float valve guided between the rods.

In testimony whereof I affix my signature.

ROBERT M. MANNING.